United States Patent [19]
Strong

[11] Patent Number: 5,194,278
[45] Date of Patent: Mar. 16, 1993

[54] FRUIT-FLAVORED, ROASTED NUTS

[75] Inventor: David R. Strong, Denville, N.J.

[73] Assignee: Nabisco, Inc., Parsippany, N.J.

[21] Appl. No.: 782,689

[22] Filed: Oct. 25, 1991

[51] Int. Cl.$^5$ ............................................. A23L 1/36
[52] U.S. Cl. ................................... 426/293; 426/296; 426/309; 426/438; 426/632; 426/93
[58] Field of Search ................ 426/93, 293, 296, 309, 426/438, 632, 291, 305, 629, 639, 303, 304, 307, 438, 89, 94, 103, 138

[56] References Cited

U.S. PATENT DOCUMENTS

| | | | |
|---|---|---|---|
| 4,161,545 | 7/1979 | Green | 426/93 |
| 4,522,833 | 6/1985 | Sharma | 426/93 |
| 4,647,463 | 3/1987 | Hoover | 426/293 |
| 4,692,342 | 9/1987 | Gannis | 426/293 |
| 4,738,865 | 4/1980 | Morris | 426/658 |
| 4,769,248 | 9/1988 | Wilkins | 426/303 |
| 4,822,625 | 4/1989 | Gannis | 426/93 |
| 4,828,858 | 5/1989 | Holloway | 426/309 |
| 4,910,028 | 3/1990 | Bernacchi | 426/93 |
| 4,927,645 | 5/1990 | Lee | 426/103 |
| 4,931,304 | 6/1990 | Sharma | 426/632 |
| 4,981,707 | 1/1991 | Morris | 426/93 |
| 5,002,802 | 3/1991 | Gannis | 426/93 |
| 5,061,499 | 10/1991 | Holloway | 426/93 |

*Primary Examiner*—Carolyn Paden

[57] ABSTRACT

The present invention relates to edible cores, especially nuts (peanuts, cashews, etc.), having a desirable fruit flavoring. More particularly, the invention relates to edible cores which are prepared by coating with an adhesive solution containing a source of fruit flavoring and then roasting, to provide a snack having desired roasted taste and appearance and a fruit flavoring.

22 Claims, 1 Drawing Sheet

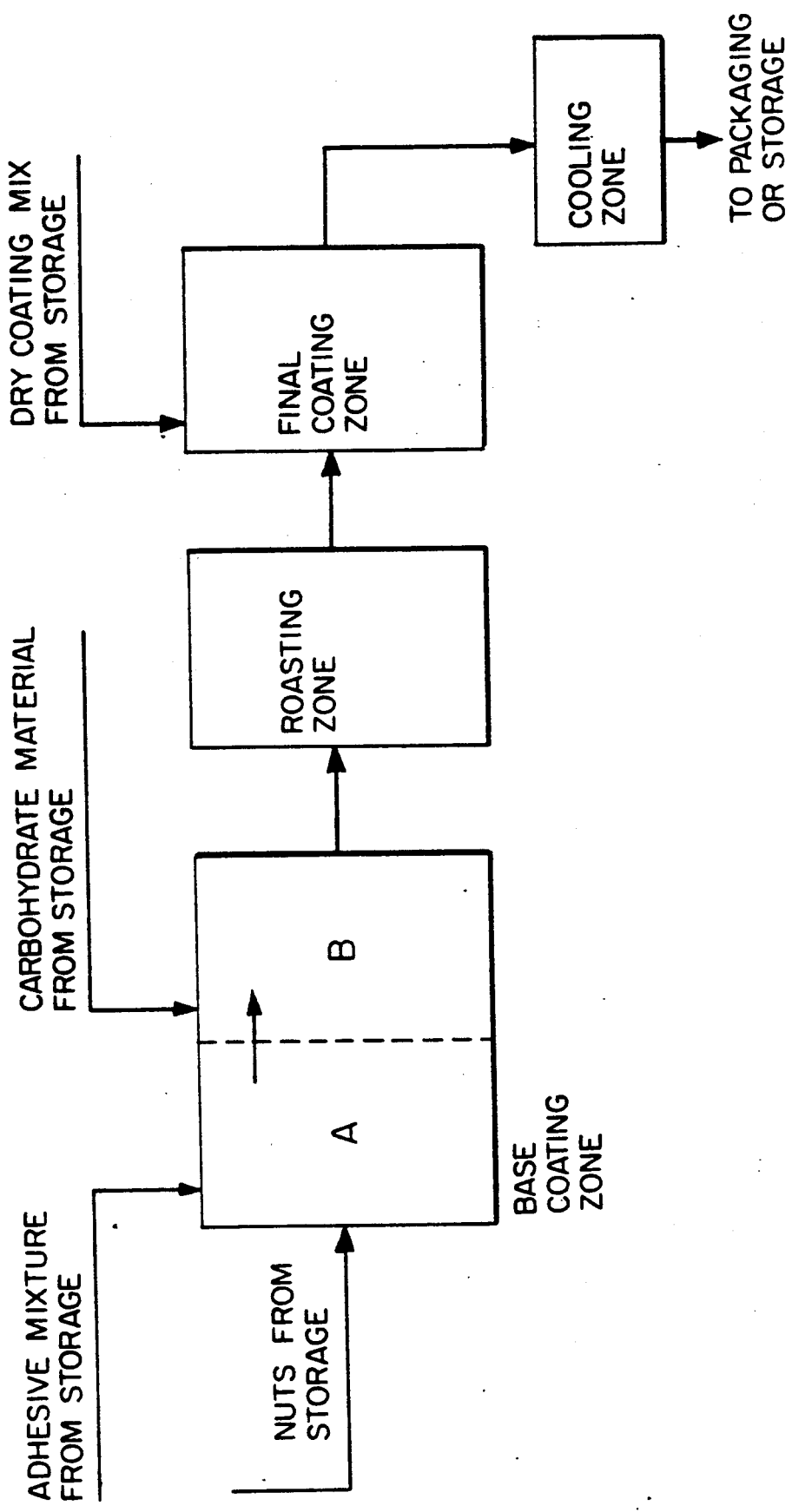

FRUIT-FLAVORED, ROASTED NUTS

BACKGROUND OF THE INVENTION

This invention relates to a process for preparing roasted, fruit-coated nuts, and is more particularly concerned with the process for preparing roasted, fruit-flavored edible nuts wherein the fruit-flavored coating is sufficient to provide a distinguishable fruit taste to the resulting snacks.

The application of fruit flavors to roasted nuts has been suggested before, such as by Baxley in U.S. Pat. No. 3,645,752; Werner and Finkel in U.S. Pat. No. 4,663,175; and Sharma in U.S. Pat. No. 4,522,833. These disclosures generally teach that fruit flavors or essences can be included in coatings for nuts comprising honey, etc. In addition, Chen, Rizzuto, and Veiga, in U.S. Pat. No. 4,423,085, describe the production of a cocrystallized sugar-nut product which can contain fruit; and Kveladze, Razdolskii, and Katsobashv have disclosed an apparatus for preparing grape juice coated nuts in SU 1311695.

It is desirable, though, to produce fruit flavored roasted nuts, since consumers find both roasted nut taste and fruit taste to be both compatible and desirable. The present invention, accordingly, provides both of these complementary flavors in a single roasted snack.

SUMMARY OF THE INVENTION

It is an object of this invention to provide fruit-flavored, roasted edible cores having desirable eye appeal, texture, and flavor.

It is a further object of this invention to provide roasted nuts having a coating thereon comprising a mixture containing fruit flavors.

It is yet another object of this invention to provide a continuous process for the preparation of fruit-flavored, roasted snacks having an adherent coating, desirable eye appeal, texture, and flavor.

These objects and other objects and advantages, which will become apparent from the description which follows, are accomplished by the practice of this invention. Thus, in one aspect, the invention comprises a process for the provision of fruit-flavored, roasted edible cores, including the steps of coating an edible core with a mixture comprising fruit-flavorings, then coating with a carbohydrate material, followed by roasting and, optionally, thereafter applying a coating of a dry mixture of sugar and salt. The process of the invention provides the greatest improvements where roasting is achieved by either immersing the cores in hot, edible oil, or roasting with hot air.

DESCRIPTION OF THE DRAWING

The invention will be better understood and its advantages will become more apparent from the following detailed description, especially when read in light of the attached drawing which is a flow sheet illustrating schematically one embodiment of the process of the invention.

DETAILED DESCRIPTION OF THE INVENTION

The process of the invention can be applied for the coating of edible cores such as seeds like sunflower and pumpkin seeds, and nuts. The process will be described with particular reference to coating nuts, especially peanuts, but it is to be understood that the process is not limited to these species but can be applied to cores comprising any of the edible products commonly employed in the art of preparing snack products.

The nuts which are treated in accordance with the invention can be any of those edible nuts which are conventionally packaged and sold as snack-type products or which are utilized for decoration or as fillers in the confectionery and baked foods industries. Illustrative of such nut meats are peanuts, cashews, almonds, walnuts, filberts, macadamia nuts, pecans, and the like. Particularly preferred products provided in accordance with the invention are those derived using peanuts and cashews as the starting materials.

The nuts are deshelled in a preliminary step, and, optionally, may also be subjected to other conventional procedures, such as blanching and the like, prior to being subjected to the process of the invention. The term "raw nuts" is used hereinafter to refer to nuts in the form in which they are subjected to the first step of the process of the invention irrespective of what preliminary treatment, if any, has been applied to the nuts. Thus, white-roasted nuts and nuts which have been subjected to a process to remove a portion of their fat content are included within the meaning of this term. Typically, white-roasted nuts will have a moisture content above about 3%.

As a further preliminary step, especially when the nuts are to be dry roasted, a pre-dust coating may be applied to the nuts to facilitate adhesion of subsequently applied coatings. Such a pre-dust coating can advantageously comprise an edible protein such as gelatin or corn starch, and is most preferably corn starch.

In an initial step of the process of the invention, the nuts are subjected to a liquid coating step, wherein the nuts are coated with an adhesive mixture or syrup containing fruit flavors. This initial liquid coating step is accomplished using any conventional coating means employed in the art. Advantageously, the coating is accomplished in a conventional coating drum, where the adhesive mixture is preferably at a temperature of from about 140° F. to about 200° F., more preferably about 150° F. to about 170° F.

The nuts are introduced into the drum and the appropriate amount of the adhesive mixture is introduced while providing agitation by rotating the drum at an appropriate speed until the nuts are uniformly coated with a layer of the adhesive mixture. Alternatively, and preferably, particularly when the process is carried out on a continuous basis, the nuts and the adhesive mixture are introduced simultaneously in the appropriate portions and rotation of the drum is carried out as before until uniform coating is achieved. In general, the adhesive mixture is employed in a range of about four parts by weight to about 15 parts by weight, and preferably in a range from about five parts by weight to about nine parts by weight, per 100 parts by weight of nuts.

One of the distinguishing features of the process of the invention lies in the nature and composition of the adhesive mixture, which comprises fruit flavors, preferably in the form of fruit juice solids. The solution preferably comprises a mixture of fruit juice solids, sweeteners, a hydrocolloid material, and water, which are combined so as to form an adhesive syrup. Advantageously, the proportions of these components preferably lies within the following ranges (all percentages by weight of total mixture):

fruit juice solids—about 12% to about 68% sweetener—about 0 to about 40%
water—about 32% to about 88%
hydrocolloid material—0 to about 3.0%.

Most advantageously, the proportions of the above components lie within the following ranges of percentages by weight:
fruit juice solids—about 35% to about 45%
water—about 55% to about 65%
hydrocolloid material—about 0.05% to about 0.20%.

Fruit juice solids used in the adhesive syrup of the present invention can be provided as the fruit juice solids themselves, which are considered for the purposes of this invention to have 0% moisture. In addition, the solids can be provided in the form of a fruit juice concentrate or as fruit juice itself. When provided as either fruit juice concentrate or fruit juice itself, this component also provides some or all of the water used in the inventive adhesive syrup. For instance, if the fruit juice solids are provided in a fruit juice concentrate comprising 68% fruit juice solids, the remaining 32% of the concentrate is considered water which makes up the water component of the adhesive syrup. Accordingly, it will be understood that a syrup which comprises fruit juice concentrates alone can be used as the adhesive solution since it comprises both fruit juice solids and water.

Fruits which may be used as the fruit juice solids for the adhesive solution include all fleshy fruits, which are the ripened ovaries of flowers, with or without other associated parts. These fruits include apple, cherry, peach, pear, nectarine, grape, fig, plum, orange, lemon, lime, blackberry, raspberry, strawberry, blueberry, boysenberry, banana, pineapple, watermelon, and coconut. Also included are fruits which have been treated, for example, dried, such as raisin, prune, and dried fig, apple, or banana.

The fruit juice which can be used in preparing the products of the present invention is preferably in the form of an unclarified fruit juice, which contains the juice of one or more fruits. Advantageously, the fruit juice has a fruit juice solids content (based upon 0% moisture in the solids) of less than 55% by weight, more preferably less than about 45% by weight.

Where the naturally occurring fruit juice as freshly obtained from the fruit has a solids content of less than about 12% by weight, the solids content of the juice is preferably concentrated. This can be accomplished, for instance, by removing some of the water content of the juice by commonly employed techniques for forming fruit juice concentrates or by adding a high fruit solids content material thereto, such as a pureed fruit.

Where the naturally occurring fruit has a relatively high solids content, such as in the case of banana, fig, coconut, and the like, the fruit may be pureed or cyrogenically milled and then diluted with water or a low solids content juice of another fruit, to provide a fruit juice having the desired solids content for the purposes of the present invention.

The fruit juice concentrate useful in the present invention is fruit juice as described above, which has a solids content in excess of 55% and, preferably, in excess of about 62% by weight. Most preferably, the solids content of the concentrate is between about 65% and about 90% by weight. Where the naturally occurring fruit juice has a solids content of less than 55% by weight, the solids content of the concentrate can be increased as noted above by removing some of the water content of the juice by commonly employed techniques for forming fruit juice concentrates, or by adding a high-fruit solids content material thereto, such as a pureed fruit.

Optionally, some of the fruit juice solids in the adhesive mixture can be replaced by one or more sweeteners. Although replacing some of the fruit juice concentrate with sweeteners results in less of a fruit flavor, a strong enough fruit flavor will still be present (along with additional sweetness), especially if the fruit juice solids are from fruits having a more pronounced flavor note such as oranges and other citrus fruits. Advantageously, the sweetener when used can comprise a sugar such as sucrose, corn syrup, or other known sweeteners and is present in the adhesive mixture at a level of up to about 40% by weight.

The sweetener, when used, can also be any one of known artificial sweeteners including 1-aspartyl-1-phenylalanine methyl ester (commercially available as aspartame or NutriSweet brand sweetener), saccharine, cyclamate, and the potassium salt of 6-methyl-3,4-dihydro-1,2,3-oxathiazin-4-one 2,2-dioxide (commercially available as acesulfame-K). An artificial sweetener is present in an amount suitable for providing sweetness equivalent to that if sucrose is used, usually about 0.001% to about 40% by weight.

Because artificial sweeteners are known to have a sweetness which is equal to, or as high as about 50,000 times that of sucrose, such sweeteners are generally used in much lesser quantities than sucrose. When the artificial sweetener has a sweetness substantially greater than sucrose, a bulking agent can be included in the inventive composition in order to insure that the appropriate viscosity and other characteristics of the adhesive mixture are maintained. Accordingly, when the sweetener comprises an artificial sweetener present in an amount of about 0 to about 40% by weight of the mixture, such sweetener will be deemed to include a bulking agent when necessary. When the artificial sweetener utilized is approximately equal in sweetness to that of sucrose, and is therefore present in similar amounts, no bulking agent need be used.

Typical bulking agents which are suitable for use in the sweetener of the adhesive mixture of the present invention should advantageously contribute no or little taste to the product and are preferably carbohydrates, which are most preferably at least partially non-digestible. Exemplary of such bulking agents are polydextrose, isomalt (commercially available as Palatinit), isomaltulose (commercially available as Palatinose), polyglucose, polymaltose, carboxymethylcellulose, microcrystalline cellulose, cellulose gel, arabinogalactan, as well as mixtures or combinations of any of these.

Other optional additives may be present in the adhesive mixture in amounts generally less than about 25% by weight of the total mixture. Illustratively, natural or derived hydrocolloid materials, such as dextrin compositions, can be incorporated into the adhesive solution. Other exemplary hydrocolloid materials are xanthan gum, gum arabic, guar gum, locust bean gum, sodium carboxymethylcellulose, microcrystalline cellulose, methylcellulosic pectins, carrageenan, and the like, which can be present in the adhesive solution in amounts up to about 3.0% by weight. Most preferably, the hydrocolloid material, for example, xanthan gum, will be employed at a level of about 0.05% to 0.20% by weight.

The adhesive mixture is advantageously prepared by first preparing an aqueous mixture of the xanthan gum or other hydrocolloid material (when used) and then blending this with the fruit juice and fruit juice concentrate, and the sweetener (when used), especially sucrose, which advantageously is in the form of a fruit granular grade, and/or corn syrup. The resulting mixture is then preferably heated with agitation to a temperature of about 140° F. to about 200° F., and more preferably from about 150° F. to about 170° F., until substantially in solution to form a syrup.

If desired, the heating of the resulting syrup can be continued at a sufficiently high temperature to remove some of the water and increase the viscosity and/or specific gravity of the adhesive solution to any desired value.

The viscosity and specific gravity of the adhesive mixture should be that effective for facilitating the coating of the adhesive mixture on nuts. However, care must be taken to avoid a final product having a "sticky" coating, which leads to clumping and other undesirable effects.

Advantageously, the viscosity of the adhesive mixture is within the range of about 1200 to about 1800 cps as measured on a Brookfield R.V.T. helipath viscometer, using a No. 1 spindle at 10 revolutions per minute (rpm) at 145° F. The specific gravity of the adhesive solution is advantageously within the rang of about 1.27 to about 1.28.

In a second coating stage of the inventive process, a dry mixture comprising a carboyhydrate material, such as a sugar like sucrose or the like, is applied to the nuts to provide a uniform coating thereon. Any of the forms of sucrose available commercially can be employed. Sucrose of the grade known as fruit granular has been found to be particularly adapted for use as the carbohydrate material employed in this stage. The carbohydrate material advantageously has a particle size of about 40 U.S. mesh to about 140 U.S. mesh. This dry mixture may also comprise other desirable ingredients, including salt and fruit juice solids to enhance taste and coating appearance.

The proportions in which the carbohydrate material is applied in this finish coating step are advantageously in the range of about 1 parts to about 6 parts, and preferably from about 2.0 parts to about 5.5 parts by weight per 100 parts by weight of nuts.

In a particular embodiment, which is employed advantageously when the process of the invention is being operated on a continuous basis, the two coating operations are carried out sequentially in a single coating drum which is inclined and/or provided with means such as a helical auger for advancing the nuts along the length of the drum as the latter is rotated.

The adhesive mixture is applied to the nuts in a first zone of such a device and, after the nuts have been uniformly coated, the dry coating of carbohydrate material is introduced in a second zone of the device. The residence time of the nuts in such a coating device is adjusted, advantageously by adjusting the speed of rotation of the drum or its angle to the horizontal, so as to provide adequate time for each coating to be accomplished uniformly and completely.

The raw, coated nuts are next subjected to roasting using procedures which may vary depending upon the particular type of raw nut which is being processed. Typically, the nuts are roasted in an edible oil, such as refined peanut oil, at a temperature in the range of about 285° F. to about 340° F., preferably from about 315° F. to about 325° F., and for a time which will vary depending upon the particular type of nut being processed and upon the temperature of roasting and the degree of roasting desired.

Illustratively, the time and extent of roasting will be greater in the case of peanuts (from about 4.0 to about 9 minutes) than in the case of cashews (from about 1.5 to about 4.5 minutes). The most appropriate roasting conditions to be adopted in any particular instance can be determined readily by a process of trial and error.

The roasting operation can be conducted on a batch or continuous basis. In the case of a continuous oil roasting operation, the nuts are retained on a continuous web of wire mesh, fabricated from stainless steel or the like, and transported on a continuous basis through a bath of edible oil heated to a temperature within the range set forth above. The residence time of the nuts in the bath is adjusted to provide the desired time of roasting.

The roasted nuts, whether roasted on a continuous or batch basis, are then passed to the final coating stages of the process of the invention. Preferably, any excess oil remaining on the nuts after the roasting step has been completed is allowed to drain off before subjecting the roasted nuts to this final coating stage.

In the case of dry roasting, by which is meant air roasting or granular roasting, the nuts are roasted to a moisture content of less than about 3%, preferably less than about 2%. Most preferably, the nuts are dry roasted to a moisture level of about 1.5% or less.

In air roasting, the nuts are roasted in a stream of hot air at a temperature of about 275° F. to about 400° F., advantageously about 320° F. to about 335° F. Roasting times and temperatures can be varied depending upon the particular type of nut being processed, as well as the roasting temperature and degree of roasting desired. Illustratively, the time and extend of roasting will be greater for peanuts (i.e., about 10 minutes to about 30 minutes) than for cashews (i.e., about 3 minutes to about 15 minutes). The most appropriate conditions to be adopted in any particular instance can be readily determined by the skilled artisan.

In granular roasting, the nuts are contacted with a finely divided heat transfer media which is heated to a temperature of about 315° F. to about 465° F., preferably about 380° F. to about 410° F. Roasting times and temperatures will vary depending upon the particular type of nut being processed and the degree of roasting desired. Illustratively, the time and extent of roasting will be greater in the case of peanuts (i.e., about 1 minute to about 9 minutes) than in the case of cashews (i.e., about 30 seconds to about 3 minutes).

The finely divided heat transfer vehicle useful in the practice of this invention can be any suitable finely divided material which will absorb heat from a heat source, such as a flame, and transfer the heat to the nuts upon contact. Preferably, the finely divided heat transfer vehicle can be salt, ceramic beads, sand, or metal balls, and is mos preferably ceramic beads.

After roasting, especially after oil roasting, a dry mixture of sucrose and salt is optionally but advantageously applied to the nuts to provide a uniform coating thereon in a final coating stage of the inventive process. The dry mixture employed in this finish coating operation advantageously comprises from about 2 to about 3 parts, and preferably about 2.5 parts by weight of sucrose to each part of salt. Any of the forms of sucrose available commercially can be employed.

Sucrose of the grade known as fruit granular has been found to be particularly adapted for use in the dry mixture employed in this stage. The salt is also a fine granulation, the grade known as flour salt being suitable. The dry mixture advantageously has a particle size of about 40 U.S. mesh to about 140 U.S. mesh. The dry mixture may also comprise fruit juice solids, as well as other flavorings.

The proportions in which the dry mixture of sucrose and salt are applied in this finish coating step are advantageously in the range of about 4 parts to about 6 parts, and preferably from about 5.0 parts to about 5.5 parts by weight per 100 parts by weight of nuts.

When the finish coating operation has been completed, the resulting roasted and coated nuts are cooled or allowed to cool, if necessary to ambient temperature and then packaged in any appropriate matter for marketing or stored.

The nuts which are prepared in accordance with the invention are characterized by a thick, adherent coating having a fruit flavor note and otherwise good roasted flavor; an attractive appearance in terms of color and surface, the surface being caramel-colored and non-glossy, but free from substantial granulation; a highly desirable, crunchy texture; and good freedom from nut to nut clumping.

The flow sheet shown in the FIGURE illustrates a continuous process for providing fruit-flavored, roasted nuts in accordance with the invention. In the first step of this process, the nuts are conveyed by continuous belt conveyor or like means to the BASE COATING ZONE. The nuts are conveyed and introduced continuously and in the desired proportions to the BASE COATING ZONE via an entry port in the first section (A).

The first coating section comprises any mechanical, continuous coating means commonly employed in the coating art. Illustrative of such coating apparatus are revolving coating drums in which the nuts are caused to tumble, to provide even distribution of the adhesive mixture over the surface of the roasted nuts. Advantageously, the coating apparatus takes the form of a cylindrical coating drum mounted with its longitudinal axis aligned at a slight angle to the horizontal with the entry port at the elevated end and adapted to rotate at any desired rate to impart a tumbling action to the nuts, and to cause the nuts to be advanced at any desired rate towards the exit port of the device.

Alternatively, the coating apparatus employed in the first section comprises an open trough, having a semi-circular cross section provided with agitating and advancing means such as a rotating helical auger which imparts the tumbling action necessary to ensure uniform coating to the nuts and, at the same time, causes the nuts to be conveyed along the length of the BASE COATING ZONE at a rate effective to assure a uniform, suitably tacky surface to enable pickup of the dry coating.

A particularly useful type of agitating and propulsion means is that which is available under the trademark Thermascrew from Bepex. This device provides agitation and product advancement and also serves to provide heat to the nuts if desired. Advantageously, the adhesive mixture is at a temperature in the range from about 140° F. to about 200° F., preferably from about 150° F. to about 170° F., prior to introduction into the first coating section.

When the adhesive mixture and the nuts have been blended sufficiently to provide a uniform coating of the mixture on the nuts, the dry coating operation is commenced. In this operation, the stream of adhesive coated nuts encounters a continuous stream of the carbohydrate material (as hereinbefore described) which is introduced by appropriate conveyor means into the BASE COATING ZONE at a rate which is adjusted to provide the desired proportion of carbohydrate material to nuts as discussed above.

This application of the stream of carbohydrate material (especially sugar) can be accomplished preferably in a later section (B) of the same coating apparatus as that employed in the continuous application of the adhesive mixture. Alternatively, the continuous application of the dry coating stream can be performed in a separate coating apparatus to which the stream of adhesive coated nuts is conveyed by means of a continuous conveyor belt or mesh. When such a separate coating apparatus is employed, it can take the form of any of the apparatus described and exemplified in reference to the apparatus used in the adhesive coating step.

The rate of continuous passage of the nuts through the second coating section (B), whether this section forms part of the same coating apparatus as section (A), or as a separate coating apparatus, is adjusted so as to permit the uniform application of a coating of sugar to the nuts prior to the removal of the coated nuts from the BASE COATING ZONE. Advantageously, the rate of passage of the nuts is adjusted so that the total residence time of the nuts, sections (A) and (B), is on the order of about 1 minute to about 2 minutes, and preferably from about 1.5 minutes to about 1.75 minutes.

In a preferred embodiment, the average temperature of the nuts for passage through the BASE COATING ZONE is brought to within the range of about 140° F. to about 200° F., preferably about 150° F. to about 180° F., by passing a stream of ambient air through the continuous stream of nuts, preferably conveyed on a foraminous belt. The ambient air should be effective to provide a slightly grainy appearance. If too hot, the nuts will have a glossy, candy appearance; and, if too cool, the product will have a dusty appearance, and may cause excessive coating loss during normal commercial shipping and handling.

After coating, the nuts are then conveyed to the ROASTING ZONE wherein the nuts are subjected to roasting for a predetermined period of time and at a temperature in the range of about 285° F. to about 340° F. As discussed above, the precise range of temperatures employed in any given instance depends upon the particular nut being treated.

The apparatus employed in the ROASTING ZONE ca be any of the oil or dry roasting (by which is meant air or granular roasting) devices known in the art which are capable of operation on a continuous basis. Oil roasting devices generally comprise a continuous wire mesh conveyor, onto which the coated nuts are dispensed in a continuous stream, and which then conveys the nuts through a bath containing an edible oil such as peanut oil maintained at the desired temperature.

The rate at which the conveyor moves continuously through the bath is adjusted so that the desired residence time of the nuts in the oil bath is achieved. In general, the residence time can vary within the range of about 1.5 to about 7 minutes, depending upon the particular type of nut being treated and roasting temperatures employed. Illustratively, the longer residence times within the above range are appropriate when peanuts are being subjected to the process of the invention, whereas the shorter residence times are appropriate for cashew nuts.

When dry roasting is desired, the apparatus employed in the ROASTING ZONE can be any of the dry roasting devices known in the art, which are capable of operation on a continuous basis. Such devices generally comprise an endless foraminous belt which carries a bed of nuts through a succession of heating zones usually followed by a cooling zone. Prior to or during cooling, the nuts are agitated to ensure separation for the best results.

In general, the residence time of the nuts in the ROASTING ZONE when dry roasting is effected varies within the range of about 15 to about 30 minutes, depending upon the particular type of nut being treated, the roasting times, and the bed depth. Illustratively, longer residence times within the above range are appropriate when peanuts are being subjected to temperatures as noted above at bed depths of about 2 to 10 inches whereas shorter residence times are appropriate for cashew nuts under similar conditions.

When the nuts have been oil roasted, the continuous flow of roasted nuts emerging from the ROASTING ZONE is then discharged onto a continuous belt conveyor or like conveying means and advantageously transferred to the FINAL COATING ZONE. In a particular embodiment, the roasted nuts emerging from the ROASTING ZONE, when oil roasted, remain on the wire mesh conveyor belt while the latter is still in motion for a short period of time, advantageously of the order of about 0.5 to about 2.0 minutes, to allow excess oil to drain from the nuts prior to the point at which the nuts are discharged onto the continuous belt conveyor for transfer to the FINAL COATING ZONE. The nuts are conveyed and introduced at continuously and in the desired proportions to the FINAL COATING ZONE via an entry port therein.

The FINAL COATING ZONE comprises any mechanical, continuous coating means commonly employed in the coating art, as described above. Advantageously, as noted, the coating apparatus takes the form of a cylindrical coating drum mounted with its longitudinal axis aligned at a slight angle to the horizontal with the entry port at the elevated end and adapted to rotate at any desired rate to impart a tumbling action to the nuts, and to cause the nuts to be advanced at any desired rate towards the exit port of the device. In this operation, a stream of coated and roasted nuts encounters a continuous stream of the mixture of dry granular sugar and salt (as hereinbefore described), which is introduced by appropriate conveyor means into the final coating zone at a rate which is adjusted to provide the desired proportion of sugar and salt to nuts as discussed above.

In a preferred but optional step in the process of the invention, the continuous flow of nuts being transferred from the ROASTING ZONE to the FINAL COATING ZONE is subjected to an additional operation designed to affect separation or singularization of the individual nuts. This can be achieved in a convenient manner by operating the belt conveyor, onto which the flow of nuts is discharged in the roasting zone, at a faster rate than that of the mesh conveyor belt on which the nuts have been transported through the ROASTING ZONE. The resulting sudden acceleration in rate of movement of the nuts serves to achieve the desired separation.

In an optional but desirable final step of the process of the embodiment of the invention as illustrated in the FIGURE, the stream of roasted, coated nuts is discharged from the FINAL COATING ZONE onto a continuous belt or like transporting means and passed to a COOLING ZONE in which the temperature of the nuts is reduced to a temperature below 100° F. This operation serves to ensure that excessive roasting of the nuts does not occur in storage bins due to maintenance at high temperature. It is also found that the tendency of the treated nuts to adhere to each other, especially upon storage, is greatly reduced, if not eliminated, by passage through the COOLING ZONE.

The COOLING ZONE advantageously comprises a closed or partially closed area through which filtered, ambient air is caused to flow at a rate sufficient to achieve the desired reduction in temperature. The efficiency of this cooling step is greatly enhanced by transporting the nuts through the COOLING ZONE on a conveyor belt which is perforated to permit passage therethrough of cooling air or inert gas. A particularly preferred embodiment employs a continuous wire mesh belt conveyor, thereby permitting maximum contact between cooling gas and the nuts.

The stream of treated nuts emerging from the cooling zone is then collected and transported by any appropriate means to a packaging station (not shown) where packaging of the nuts by any appropriate and conventional means is accomplished.

The following, non-limiting examples illustrate processes for the continuous production of fruit-flavored, roasted nuts in accordance with the embodiment shown in the FIGURE and discussed above.

EXAMPLE I

Five hundred grams of shelled and blanched peanuts are placed in a revolving coating pan to which is added 63.7 grams of an adhesive solution comprising 95.27% of a pear fruit juice concentrate and 4.73% of a 4.18% xanthan gum solution in water. The adhesive solution comprises 41% fruit juice solids. The nuts and adhesive solution are tumbled in the coating pan until all of the peanuts are evenly coated.

After coating with the adhesive solution, 72.6 grams of fruit granular grade sucrose is added to the coating pan after which the nuts are tumbled until evenly coated. The coated peanuts are then submerged in oil at a temperature of 325° F. until the desired roast is obtained.

After roasting, the nuts are removed from the oil, drained for approximately 30 seconds and placed in a revolving coating pan. A mixture consisting of 15 grams of sugar and 5 grams of salt is added and tumbling continued until the peanuts are evenly enrobed. The nuts are then removed from the coating pan and cooled to approximately 100° F.

The resulting nuts exhibit a noticeable pear flavor and have an attractive caramel colored coating.

EXAMPLE II

Five hundred grams of shelled and blanched peanuts are placed in a revolving coating pan to which is added 64.0 grams of an adhesive solution comprising 83.45% of a pear fruit juice concentrate and 16.55% of a 4.18% xanthan gum solution in water. The adhesive solution comprises 36% fruit juice solids. The nuts and adhesive are bumbled in the coating pan until all of the peanuts are evenly coated.

After coating with the adhesive solution, 84.0 grams of a fruit granular grade sucrose is added to the coating pan after which the nuts are tumbled until evenly coated. The coated peanuts are then submerged in oil at a temperature of 325° F. until the desired roast is obtained.

After roasting, the nuts are removed from the oil, drained for approximately 30 seconds, and placed in a revolving coating pan. A mixture consisting of 15 grams of sugar, 5 grams of salt, and 5 grams of a fruit juice solids composition comprising 80% fruit juice solids and 20% malto-dextrin is added and tumbling continued until the peanuts are evenly enrobed. The nuts are then removed from the coating pan and cooled to approximately 100° F.

The resulting nuts exhibit a noticeable pear flavor and have an attractive caramel colored coating.

EXAMPLE III

Five hundred grams of shelled and blanched peanuts are placed in a revolving coating pan to which is added 20 grams of an adhesive solution comprising 83.1% of raisin fruit juice concentrate and 16.55% of a 4.18% xanthan gum solution in water. The adhesive solution comprises 16.6% total fruit juice solids. The nuts and adhesive solution are tumbled in the coating pan until all of the peanuts are evenly coated.

After coating with the adhesive solution, 42.5 grams of fruit granular grade sucrose is added to the coating pan after which the nuts are tumbled until evenly coated. The coated peanuts are then submerged in oil at a temperature of 325° F. until the desired roast is obtained.

After roasting, the nuts are removed from the oil, drained for approximately 30 seconds, and placed in a revolving coating pan. A mixture consisting of 15 grams of sugar and 5 grams of salt is added and tumbling continued until the peanuts are evenly enrobed. The coated peanuts are then removed from the coating pan and cooled to approximately 100° F.

The resulting nuts exhibit a noticeable raisin flavor and have an attractive caramel colored coating.

EXAMPLE IV

Five hundred grams of shelled and blanched peanuts are placed in a revolving coating pan to which is added 75 grams of an adhesive solution consisting of 99.85% of a grape fruit juice concentrate and 0.15% xanthan gum. The adhesive solution comprises 60% fruit juice solids. The nuts and adhesive solution are tumbled until all of the peanuts are evenly coated.

After coating with the adhesive solution, 60 grams of a fruit juice solids comprising 80% fruit juice solids and 20% malto-dextrin is added to the coating pan after which the nuts are tumbled until evenly coated. The coated peanuts are then submerged in oil at a temperature of 325° F. until the desired roast is obtained.

After roasting, the nuts are removed from the oil, drained for approximately 30 seconds, and placed in a revolving coating pan. A mixture consisting of 30 grams of a fruit juice solids composition comprising of 80% fruit juice solids and 20% malto-dextrin, and 5 grams of salt is added and tumbling continued until the peanuts are evenly enrobed. The coated peanuts are then removed from the coating pan and cooled to approximately 100° F.

The resulting nuts exhibit a noticeable grape flavor and have an attractive caramel colored coating.

EXAMPLE V

Five hundred grams of shelled and blanched peanuts are placed in a revolving coating pan to which is added 1.15 grams of corn starch as a dry adhesive pre-dust. Tumbling is continued until the peanuts are evenly coated. After coating with corn starch, 21.7 grams of an adhesive solution comprising of 28% of a raisin fruit juice concentrate, 20% of a dextrin composition and 52% of water. The adhesive solution comprises 19% fruit juice solids. The nuts and adhesive solution are tumbled until all of the peanuts are evenly coated.

After coating with the adhesive solution, 12.2 grams of mixture comprising 22.5 grams of fruit juice solids, 67.6 grams of sugar, and 9 grams of salt is added to the coating pan after which the nuts are tumbled until coated.

The coated peanuts are then placed on a perforated drying tray and placed in a forced hot air oven and roasted at 295° F. until the desired roast is obtained. After roasting, the peanuts are cooled to approximately 100° F.

The resulting nuts exhibit a noticeable raisin flavor and have an attractive caramel colored coating.

It is to be understood that the above examples are given by way of illustration only and are not to be construed as limiting the scope of the invention, which is defined by the following claims.

What is claimed is:

1. A process for preparing fruit-flavored, roasted nuts which comprises: coating raw nuts with an adhesive mixture comprising a mixture of fruit juice solids and water; coating the adhesive coated nuts with a dry coating of a carbohydrate material; and subjecting the thusly coated nuts to roasting.

2. The process according to claim 1, wherein said adhesive mixture comprises about 12% to about 65% by weight of fruit juice solids; and about 35% to about 88% by weight of water.

3. The process according to claim 2, wherein said fruit juice solids are provided by a composition selected from the group consisting of fruit juice, fruit juice concentrate, and mixtures thereof.

4. The process according to claim 3, which further comprises applying to the nuts a dry finish coating comprising sugar, salt, fruit juice solids, and mixtures thereof.

5. The process according to claim 4, wherein said dry finish coating comprises from about 2 to about 3 parts by weight of sugar per each part of salt.

6. The nuts produced according to the process of claim 5.

7. The process according to claim 1, wherein said adhesive solution further comprises up to 40% by weight of a sweetener.

8. The process according to claim 1, wherein said adhesive solution also comprises a hydrocolloid material.

9. The process according to claim 8, wherein said hydrocolloid material is xanthan gum.

10. The process according to claim 1, wherein said nuts are roasted in an edible oil at a temperature in the range of about 300° to about 330° F.

11. The process according to claim 1, wherein the adhesive mixture is applied to the nuts in an amount of about 4 to about 17 parts by weight per 100 parts by weight of nuts.

12. The nuts produced according to the process of claim 1.

13. A process for preparing fruit-flavored, roasted nuts which comprises the step of: continuously conveying raw nuts through a BASE COATING ZONE; uniformly coating said nuts with an aqueous adhesive mixture comprising a mixture of fruit juice solids, and water during passage of said nuts through a first section of said BASE COATING ZONE; uniformly coating said adhesive coated nuts with a coating of a carbohydrate material in a second section of said coating zone; continuously feeding raw nuts through a ROASTING ZONE in which said nuts are roasted in edible oil at a temperature of about 285° F. to about 340° F.; continuously conveying said treated nuts through a FINAL COATING ZONE and uniformly coating said nuts with a coating of a dry mixture of sugar and salt; thereafter continuously conveying said treated nuts through a COOLING ZONE.

14. The process according to claim 13, wherein said adhesive mixture employed in said BASE COATING ZONE comprises from about 12% to about 68% by weight of fruit juice solids, and from about 32% to about 88% by weight of water.

15. The process according to claim 14, wherein the adhesive mixture employed in said BASE COATING ZONE also comprises a hydrocolloid material.

16. The process according to claim 15, wherein said adhesive mixture employed in said BASE COATING ZONE is applied to the nuts at a rate of about 4 to about 17 parts by weight per 100 parts by weight of nuts.

17. The process according to claim 16, wherein said adhesive mixture is at a temperature between about 140° F. and 200° F. before entering said BASE COATING ZONE.

18. The process according to claim 17, wherein the residence time in said ROASTING ZONE is within the range of from about 4 to about 7 minutes.

19. The process according to claim 18, wherein the dry mixture of sugar and salt employed in said FINAL COATING ZONE is applied at a sugar to salt ratio of from about 2:1 to about 3:1.

20. The process according to claim 19, which comprises the additional step of conveying the nuts emerging from said ROASTING ZONE through a zone in which excess oil is permitted to drain from said nuts prior to entry of said nuts into said FINAL COATING ZONE.

21. The nuts produced according to the process of claim 20.

22. The nuts produced according to the process of claim 13.

* * * * *